(12) United States Patent
Joung et al.

(10) Patent No.: US 7,957,561 B2
(45) Date of Patent: Jun. 7, 2011

(54) APPARATUS AND METHOD FOR MEASURING QUALITY OF IMAGE RECEIVED VIA COMMUNICATION NETWORK

(75) Inventors: Jinsoup Joung, Seongnam-si (KR); Young Su Kwak, Suwon-si (KR); Jin Man Kim, Seongnam-si (KR); Jin Sam Jeong, Anyang-si (KR); Jae Hwan Lee, Ansan-si (KR)

(73) Assignee: Innowireless Co., Ltd., Seongnam-si (KR)

( * ) Notice: Subject to any disclaimer, the term of this patent is extended or adjusted under 35 U.S.C. 154(b) by 865 days.

(21) Appl. No.: 11/944,538

(22) Filed: Nov. 23, 2007

(65) Prior Publication Data

US 2008/0137968 A1      Jun. 12, 2008

(30) Foreign Application Priority Data

Nov. 23, 2006   (KR) ................. 10-2006-0116483
Jan. 29, 2007   (KR) ................. 10-2007-0008929

(51) Int. Cl.
*G06K 9/00*          (2006.01)
(52) U.S. Cl. .................... 382/112; 382/217; 382/218

(58) Field of Classification Search .......... 382/112, 382/217, 218
See application file for complete search history.

(56) References Cited

U.S. PATENT DOCUMENTS

| | | | | |
|---|---|---|---|---|
| 5,691,916 A | * | 11/1997 | Van Den Brink et al. | 370/252 |
| 6,704,451 B1 | * | 3/2004 | Hekstra et al. | 382/199 |
| 2006/0269162 A1 | * | 11/2006 | Chen et al. | 382/286 |

* cited by examiner

*Primary Examiner* — Tom Y Lu
(74) *Attorney, Agent, or Firm* — Rothwell, Figg, Ernst & Manbeck, P.C.

(57) ABSTRACT

Disclosed herein are an apparatus and method for measuring quality of an image received via a communication network. The apparatus includes an interface unit, a codec unit, a test image detection unit, and a Mean Opinion Score (MOS) measurement unit. The interface unit receives an image, including a start synchronization image and a test image via a communication network. The codec unit decodes the received image into a color signal. The test image detection unit detects any one value of brightness, saturation and hue information of the color signal input from the codec unit, calculates an average value for each frame, and detects the test image from the received image based on the calculated average value. The MOS measurement unit synchronizes the test image with a corresponding reference image, compares the quality of the test image with the quality of the reference image, calculates an MOS value based on the results of the comparison, and outputs the MOS value.

18 Claims, 5 Drawing Sheets

APPARATUS AND METHOD FOR MEASURING QUALITY OF IMAGE RECEIVED VIA COMMUNICATION NETWORK

CROSS REFERENCE TO RELATED APPLICATIONS

This application claims priority from Korean patent application No. 10-2006-0116483 filed on Nov. 23, 2006, and Korean patent application No. 10-2007-0008929 filed on Jan. 29, 2007, all of which are incorporated herein by reference in their entireties for all purposes.

BACKGROUND OF THE INVENTION

1. Field of the Invention

The present invention relates generally to an apparatus and method for measuring the quality of an image received via a communication network and, more particularly, to an apparatus and method for measuring the quality of an image received via a communication network, which is capable of measuring the quality of a test image by comparing the quality of the test image, received via the communication network, with the quality of a corresponding reference image, thereby inspecting the transmission/reception status of image data via the communication network.

2. Description of the Related Art

Recently, with the rapid development of the information/communication field, mobile communication terminals have been popularized to the extent that they have become essential portable items. Voice calls and the transmission/reception of text messages were principal functions of mobile communication terminals a long time ago, and new models having a variety of functions have been successively commercialized thanks to the advent of new technologies, and have rapidly replaced old models. In particular, as a new concept-based Digital Multimedia Broadcasting (DMB) service, in which broadcasting and communication are combined together, is actively provided in the related field, terminal manufacturers are setting a trend toward the active commercialization of new models having a DMB reception function as a principal function in response to the provision of the DMB service.

Meanwhile, a few years ago, access to the Internet was generally conducted via a wired connection, but, nowadays, the Internet can be accessed using a method of accessing the Internet via a mobile communication network based on Wireless Application Protocol (WAP) or Wireless Internet Platform for Interoperability (WIPI), or a method of accessing the Internet through a public wireless Local Area Network (LAN) or an access point. Furthermore, a portable Internet service (WiBro or WiMax), capable of enabling high-speed Internet access at ADSL-level quality and cost, either when at rest or when in intermediate-speed motion, is actively being developed towards commercialization.

Accordingly, for terminal manufacturers, it is necessary to investigate the actual quality of images received through terminals manufactured by them so as to provide desirable image quality to customers, while, for mobile communication providers, it is necessary to investigate the actual quality of images passing through mobile communication networks so as to check and optimize the performance and status of mobile communication networks managed, maintained and repaired by them. However, there is a problem in that the development thereof has not been achieved yet.

SUMMARY OF THE INVENTION

Accordingly, the present invention has been made keeping in mind the above problems occurring in the prior art, and an object of the present invention is to provide an apparatus and method for measuring the quality of an image received via a communication network, which synchronizes a test image, received via a communication network, with a reference image and evaluates the test image in comparison with the reference image in a synchronized state.

In order to accomplish the above object, the present invention provides an apparatus for measuring the quality of an image received via a communication network, including an interface unit for receiving an image, including a start synchronization image, configured to provide notification of a start of a quality test, and a test image, actually subjected to a quality test, via a communication network; a codec unit for decoding the received image, input through the interface unit, into a color signal; a test image detection unit for detecting any one value of brightness, saturation and hue information of the color signal input from the codec unit, calculating an average value for each frame, and detecting the test image from the received image based on the calculated average value; and a Mean Opinion Score (MOS) measurement unit for synchronizing the test image, detected by the test image detection unit, with a corresponding reference image, comparing quality of the test image with quality of the reference image in a synchronized state, calculating an MOS value based on results of the comparison, and outputting the MOS value.

In the above construction, the interface unit preferably has a function of generating a call for connection to a communication terminal or a function of controlling an image protocol for reception of images. The color signal is preferably RGB or YUV signals.

Additionally, the present invention provides a method of measuring the quality of an image received via a communication network, the method being configured to compare the received image, including a start synchronization image, adapted to provide notification of a start of a quality test, and a test image, actually subjected to the quality test, with a reference image and calculate an MOS value based on results of the comparison, the method including step (a) of decoding the received image into a color signal; step (b) of detecting any one value of brightness, saturation and hue information of the color signal decoded at step (a), and calculating an average value for each frame; step (c) of detecting a test image from the received image based on the average value calculated at step (b); step (d) of synchronizing the test image, detected at step (c), with a corresponding reference image; step (e) of calculating an MOS value of the test image by comparing quality of the test image with quality of the reference image in a synchronized state; and step (f) of outputting the MOS value calculated at step (e). In this construction, the color signal is preferably RGB or YUV signals.

Additionally, the present invention provides an apparatus for measuring the quality of an image received via a communication network, including an interface unit for receiving a test image, including a plurality of test frames identified using recognition marks, via the communication network; a recognition mark detection unit for identifying each test frame, input through the interface unit, by detecting a recognition mark; a reference image storage unit for storing a corresponding reference image for a quality test for the test image; and an MOS measurement unit for comparing quality of the test frame, corresponding to the recognition mark identified by the recognition mark detection unit, with quality of a reference frame of the reference image, corresponding to the identified recognition mark, calculating an MOS value based on results of the comparison, and outputting the MOS value.

In the above construction, the apparatus preferably further includes a codec unit for decoding the test image, input through the interface unit, into a color signal, and outputting the decoded test image to the recognition mark detection unit and to the MOS measurement unit.

The interface unit preferably has a function of generating a call for connection to a communication terminal, or a function of controlling an image protocol for reception of images.

The recognition mark detection unit preferably detects hue values of pixels assigned to the detected recognition mark, and recognizes a serial number unique to each recognition mark based on the detected hue value.

Additionally, the present invention provides a method of measuring the quality of an image received via a communication network, the method being configured to compare the received image, including a start synchronization image, adapted to provide notification of a start of a quality test, and a test image, actually subjected to the quality test, with a reference image and calculate an MOS value based on results of the comparison, the method including step (a) of detecting and identifying a recognition mark for each test frame; step (b) of comparing quality of a test frame, corresponding to the recognition mark identified at step (a), with quality of a reference frame of a reference image, corresponding to the recognition mark identified at step (a); and step (c) of calculating an MOS value based on results of the comparison and outputting the MOS value.

In this case, step (a) preferably includes step (a-1) of detecting hue values of pixels, assigned to the detected recognition mark, using the recognition mark detection unit; and step (a-2) of recognizing the serial number unique to the recognition mark based on the hue values detected at step (a-1).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
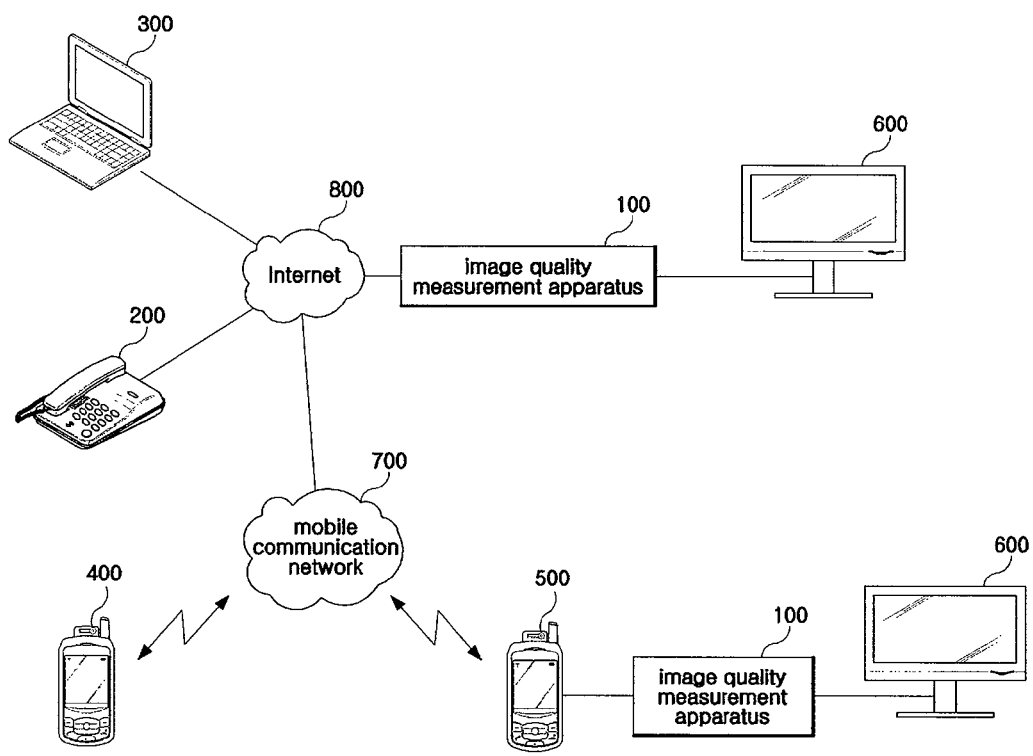
FIG. 1 is a network configuration of a system for measuring the quality of an image according to an embodiment of the present invention.

Reference now should be made to the drawings, in which the same reference numerals are used throughout the different drawings to designate the same or similar components.

Prior to a description of the present invention, a Mean Opinion Score (MOS) algorithm, which has been proposed as a method of measuring the quality of an image, will be described in brief below. That is, in the present invention, using such an MOS algorithm, an image received via a communication network is compared with a 'reference image,' and the quality level of the received image, compared with that of the reference image, is calculated. For example, the quality level of the received image may be evaluated according to the following five-level rating system, as shown in Table 1. In detail, it is preferable that the MOS algorithm be the MOS algorithm, which was defined in J.144 rev.1, recommended by ITU-T.

Meanwhile, since such a received image is received via a communication network, it is most important to synchronize the received image with a reference image so as to carry out an accurate image quality test. This will be chiefly described below. Moreover, with reference to the accompanying drawings, the apparatus and method for measuring the quality of an image received via a communication network according to the present invention will be described in detail below.

TABLE 1

| MOS value | Quality level |
|---|---|
| 5 | Excellent |
| 4 | Good |
| 3 | Fair |
| 2 | Poor |
| 1 | Bad |

FIG. 1 is a network configuration of a system for measuring the quality of an image according to an embodiment of the present invention.

As shown in FIG. 1, according to the system for measuring the quality of an image according to the present invention, MOS measurement for images exchanged between mobile communication terminals 400 and 500 via a mobile communication network 700, MOS measurement for images received from a computer 300 or a video call-enabled Voice over Internet Protocol (VoIP) phone 200 via the Internet 800 and the mobile communication network 700 to the mobile communication terminal 500, and MOS measurement for images received from the mobile communication terminal 400 via the mobile communication network 700 and the Internet 800 can be carried out. In addition, MOS measurement for images received from a server for providing images constructed by a Content Provider (CP) or the like, rather than from the terminals 200, 300 and 400 shown in FIG. 1, via at least one of the mobile communication network 700 and the Internet 800 can be carried out. Accordingly, an apparatus 100 for measuring the quality of an image according to the present invention may measure the quality of an image received via the Internet 800, or may be connected to the mobile communication terminal 500 and measure the quality of an image received via the mobile communication network 700, and the images, the quality of which has been tested, may be displayed along with resulting MOS measurement values on a Liquid Crystal Display (LCD) monitor 600. Meanwhile, it is preferred that a radio frequency transmission/reception module for enabling direct wireless connection to the Internet 800 or the mobile communication network 700 be mounted in the image quality measurement apparatus 100. In this case, the image quality measurement apparatus 100 may be provided with improved mobility, so that it can comparatively measure image quality in various areas, for example, in various base stations, using a vehicle.

Embodiment 1

Figure 2:
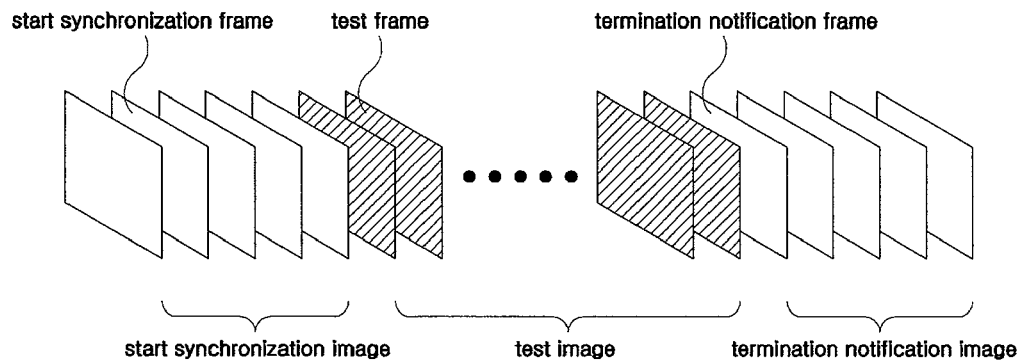
FIG. 2 is a diagram showing the frame structure of an image for the measurement of quality according to an embodiment of the present invention.

FIG. 2 is a diagram showing the frame structure of an image for the measurement of quality according to an embodiment of the present invention. As shown in FIG. 2, the structure of a received image input to the image quality measurement apparatus 100 includes a 'start synchronization image' for the synchronization of the start of a quality test, an actual 'test image,' and a 'termination notification image' for the provision of notification of the termination of a test. Here, the start synchronization image must significantly differ from the test image in brightness, hue or saturation. For example, the start synchronization image may be made to be distinguished from the test image by setting white color information for all of the pixels of the frames of the start synchronization image.

Figure 3:
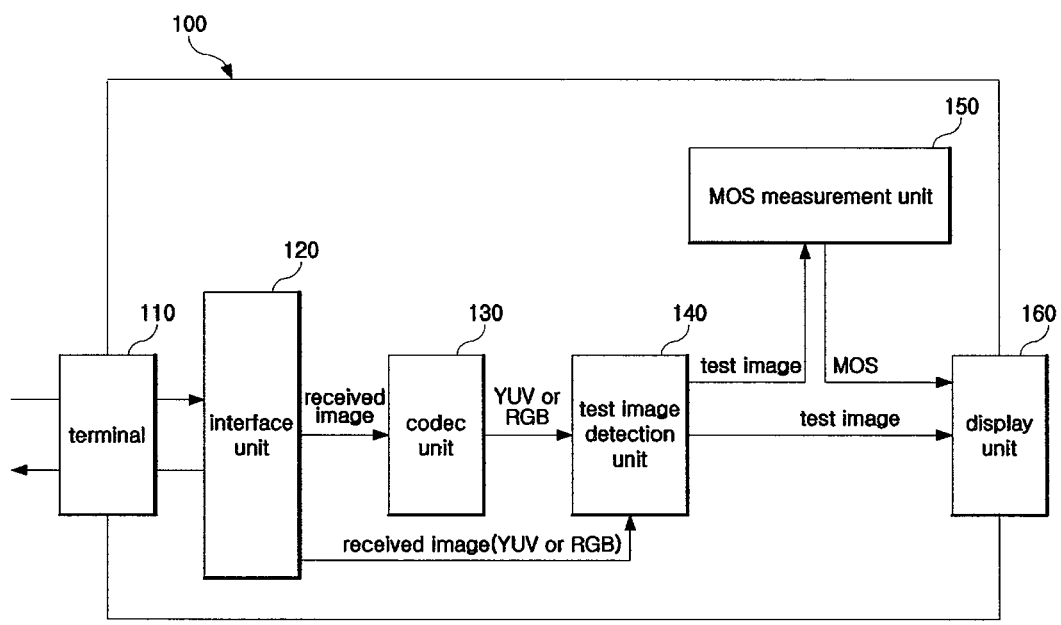
FIG. 3 is a block diagram showing the functional module configuration of an apparatus for measuring the quality of an image according to an embodiment of the present invention.

FIG. 3 is a block diagram showing the functional module configuration of an apparatus for measuring the quality of an image according to an embodiment of the present invention.

As shown in FIG. 3, the image quality measurement apparatus 100 of the present invention includes a terminal 110 for receiving and outputting various pieces of data including images; an interface unit 120, that is, a module in which functions of receiving images passed through the mobile communication network 700 or the Internet 800 are combined together, for performing a function of controlling the mobile communication terminal 500 so that it generates a call for connection to another mobile communication terminal 400 or the VoIP phone 200 or directly generating a call, a function of connecting to the computer 300 via the Internet 800, and a function of controlling various image protocols to receive images; a codec unit 130 for decoding (expanding) an image, received through the interface unit 120, into a 'color signal,' such as YUV signals or RGB signals; a test image detection unit 140 for calculating an average value for each frame by detecting the brightness (saturation or hue) values of the color signal, decoded by the codec unit 130, detecting a test image from among received images based on the average value calculated above, and storing it; an MOS measurement unit 150 for calculating the MOS value of the test image by comparing the quality of the test image, detected by the image detection unit 140, with the quality of a reference image; and a display unit 160 for displaying the test image, input from the test image detection unit 140, and the MOS value, input from the MOS measurement unit 150. Here, when the image received through the interface unit 120 has already been decoded into a color signal, this image may be input directly to the test image detection unit 140 without passing through the codec unit 130.

Meanwhile, representative color representation methods include the RGB method and the YUV method. In the RGB method, a maximum of 8 bits is assigned to each of R, G, and B, and thus 16,777,216 ($2^{24}$) colors can be represented. In particular, values assigned to R, G and B generally increase in proportion to the brightness. Accordingly, a screen used as a start synchronization frame is normally a white screen. A reference value for determining whether a screen of interest is a white screen, in other words, a criterion value for the detection of a test image, is previously set for the test image detection unit 140. Accordingly, the test image detection unit 140 performs detection by determining that a corresponding frame is a start synchronization frame (or a termination notification frame), that is, a white screen, if the average value calculated above is higher than the reference value, and determining that a corresponding frame is a test frame if the average value is equal to or lower than the reference value.

Thereafter, in greater detail, the MOS measurement unit 150 synchronizes the test image, input from the test image detection unit 140, with the reference image stored previously, calculates an MOS value by sequentially performing comparison on respective frames in the synchronized state, and outputs the calculated MOS value to the display unit 160. Here, the MOS measurement unit 150 may calculate an MOS value for each frame, or may calculate an average MOS value. For example, in the case where the status of a communication network is very unstable and any one frame of a test image is not sent, the test image is not synchronized with a reference image, so that a MOS value to be output to the display unit 160 may be '1', as indicated in Table 1.

Figure 4:
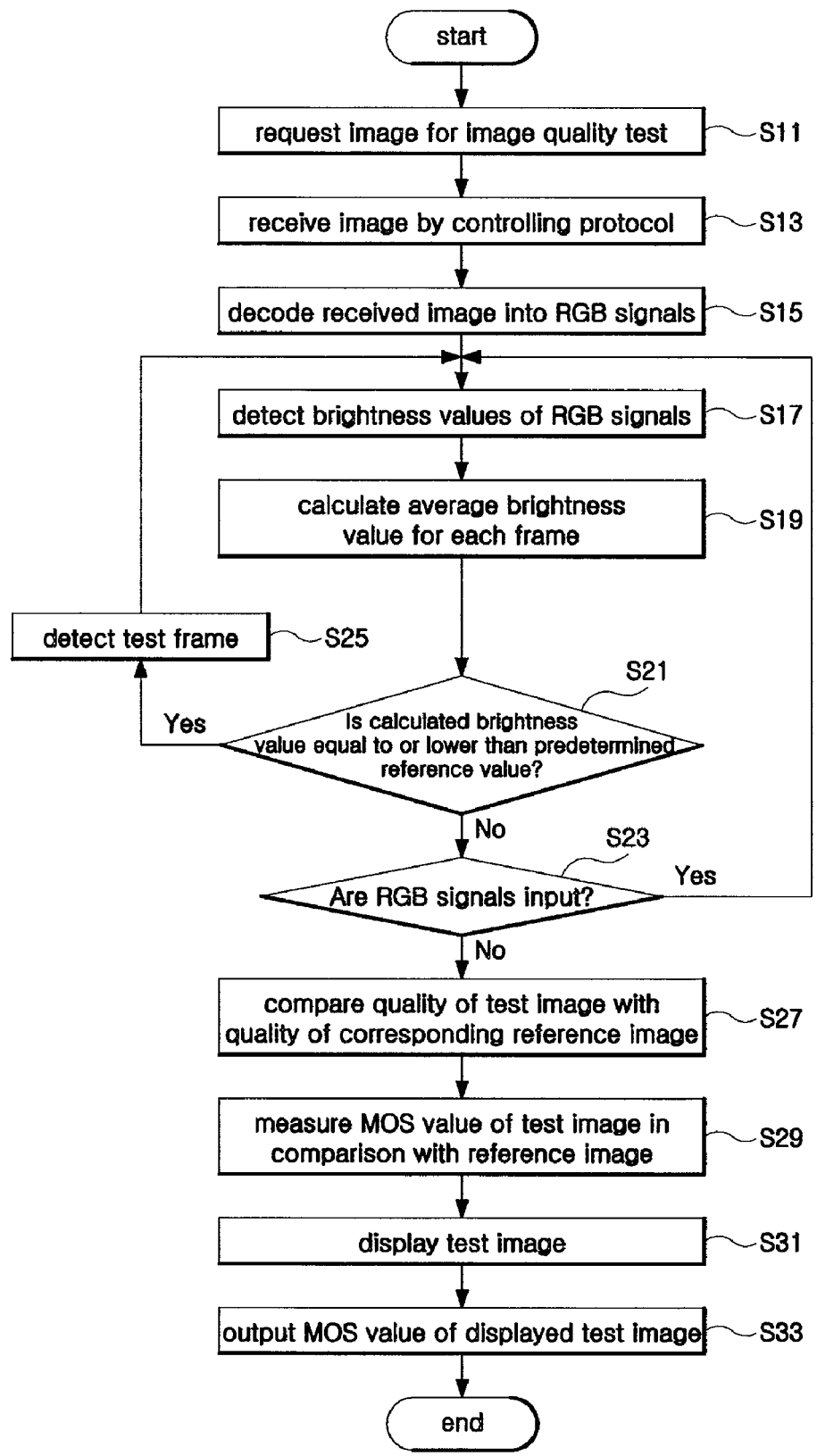
FIG. 4 is a flowchart illustrating a method of measuring the quality of an image according to an embodiment of the present invention.

FIG. 4 is a flowchart illustrating a method of measuring the quality of an image according to an embodiment of the present invention. It is noted that, in this flowchart, the following description is given based on the case where the image quality measurement apparatus 100 performs operation, and receives images from a receiving-side mobile communication terminal (hereinafter referred to as the "transmitting terminal") 400 in a state of being connected to a receiving-side mobile communication terminal (hereinafter referred to as the "receiving terminal") 500.

First, step S11 is the step of requesting an image for an image quality test from the mobile communication terminal 500. In greater detail, at this step, the image quality measurement apparatus 100 controls the receiving terminal 500 so that it generates a call to the transmitting terminal 400. Accordingly, the two terminals 400 and 500 are connected to each other, and the transmitting terminal 400 sends an image, similar to that shown in FIG. 2, to the receiving terminal 500. Here, the received image may be previously prepared in the transmitting terminal 400, may be stored in the memory of the transmitting terminal 400, or may be stored in a specific notebook computer and then sent to the receiving terminal 500 via the transmitting terminal 400.

Thereafter, the image quality measurement apparatus 100 receives the image from the transmitting terminal 400 by controlling an image protocol at step S13, decodes the received image into RGB signals at step S15, detects the brightness values of the decoded RGB signals at step S17, and calculates an average brightness value for each frame at step S19.

Thereafter, the process proceeds to step S21, and then the image quality measurement apparatus 100 determines whether or not the average brightness value is equal to or lower than a predetermined reference value. In other words, step S21 is the step of determining whether a corresponding frame is a start synchronization frame (or a termination notification frame) or a test frame.

If, as a result of the determination at step S21, the average brightness value is found to be not equal to or lower than the reference value, the process proceeds to step S23 and then whether there are decoded RGB signals is determined again. That is, the movement from step S21 to step S23 is based on the fact that, as a result of the determination at step S21, the corresponding frame is a start synchronization frame or a termination notification frame. Accordingly, if, as a result of the determination at step S23, RGB signals are found to be present, the process proceeds to step S17 and then the image quality measurement apparatus repeats steps S17 to 21.

Meanwhile, if, as a result of the determination at step S21, the average brightness value, calculated at step S19, is higher than a previously defined reference value, the process proceeds to step S25 and then the image quality measurement apparatus 100 detects a corresponding frame, and the process returns to step S17 and then the image quality measurement apparatus 100 repeats steps S17 to S21. Here, step S25 is repeated until a termination notification frame is input.

Moreover, if, as a result of the determination at step S23, RGB signals are not input, that is, if the received image is completely received, a process of detecting the test frames is terminated.

Thereafter, the image quality measurement apparatus 100 compares the quality of the detected test image with the quality of the reference image at step S27, calculates an MOS value, which is a comparison resultant value, at step S29, displays the detected test image at step S31, and outputs the MOS value of the displayed test image at step S33.

Embodiment 2

Figure 5:
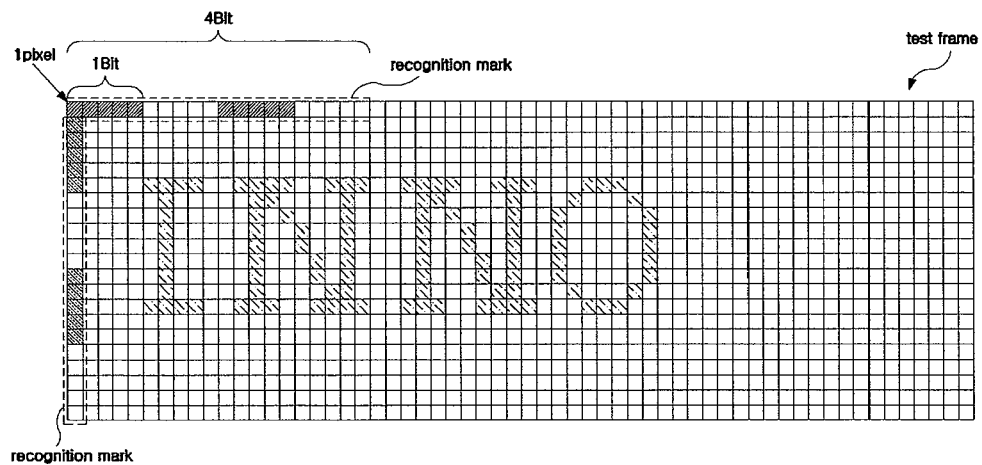
FIG. 5 is a diagram showing the frame structure of an image for the measurement of quality according to another embodiment of the present invention.

FIG. 5 is a diagram showing the frame structure of an image for quality measurement according to another embodiment of the present invention. As shown in FIG. 5, each frame (hereinafter referred to as a "test frame"), constituting part of a test image input to the image quality measurement apparatus 100, is provided with a recognition mark at a predetermined location, preferably in outermost pixels of the test frame, so as to distinguish the test frame from the other test frames. Here, it is preferred that the recognition mark be marked in each test frame in the form of a serial number. For example, when 5 pixels are set for 1 bit, as shown in FIG. 2, 4 bits, that is, 20 pixels, are assigned to one recognition mark. Furthermore, the number of recognition marks marked in a test frame may be freely determined according to the type of communication network. That is, in the case where the present invention is applied to a communication network the data transmission status of which is very unstable, the probability that the recognition mark itself will be lost is increased, in which case there may occur the case where a reference image is not synchronized with a test image, with the result that there may be the case where the measurement of image quality, which is the ultimate purpose of the present invention, is not performed appropriately. Accordingly, when a plurality of recognition marks is marked in a test frame, the reliability of the measurement of image quality is increased.

Meanwhile, in order to increase the degree of recognition of recognition marks, there must be significant difference in hue or saturation, preferably brightness, between a pixel corresponding to '1' and a pixel corresponding to '0'. For example, representative color representation methods include the RGB method and the YUV method. In the RGB method, a maximum of 8 bits is assigned to each of R, G, and B, so that 16,777,216 ($2^{24}$) colors can be represented. In particular, values assigned to R, G and B generally increase in proportion to the brightness. Accordingly, a while color value is recorded in a pixel assigned '1', and a black color value is recorded in a pixel assigned '0'.

Figure 6:
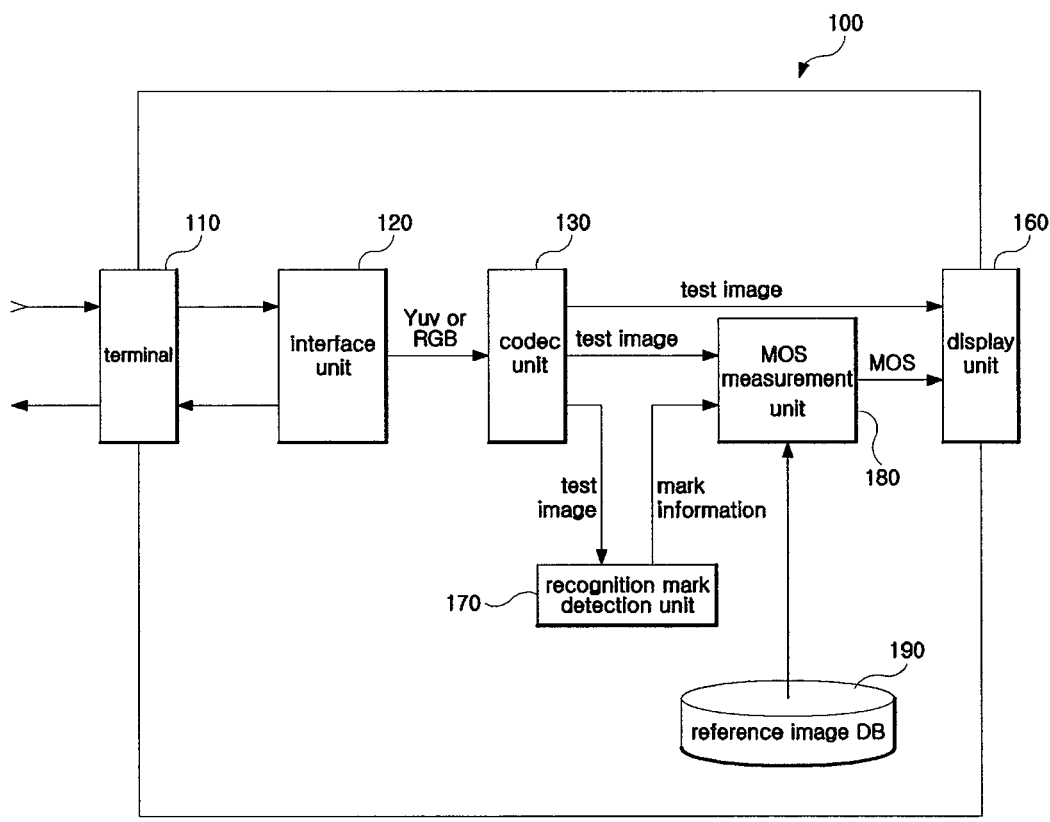
FIG. 6 is a block diagram showing the functional module configuration of an apparatus for measuring the quality of an image according to another embodiment of the present invention.

FIG. 6 is a block diagram showing the functional module configuration of an apparatus 100 for measuring the quality of an image according to another embodiment of the present invention.

As shown in FIG. 6, the image quality measurement apparatus 100 of the present invention includes a terminal 110 for receiving and outputting various pieces of data including images; an interface unit 120, that is, a module in which functions of receiving images passed through the mobile communication network 700 or the Internet 800 are combined together, for performing a function of controlling the mobile communication terminal 500 so that it generates a call for connection to another mobile communication terminal 400 or the VoIP phone 200 or directly generating a call, a function of connecting to the computer 300 via the Internet 800, and a function of controlling various image protocols to receive a test image; a codec unit 130 for decoding (expanding) a test image, received through the interface unit 120, into a 'color signal' such as YUV signals or RGB signals; a recognition mark detection unit 170 for detecting a recognition mark for each test frame, decoded and input through the codec unit 130, detecting the hue values of pixels assigned to each bit of the detected recognition mark, and recognizing a serial number through the detected hue values; an MOS measurement unit 180 for reading a frame of a reference image (hereinafter referred to as the "reference frame"), corresponding to a serial number detected by the recognition mark detection unit 170, from a reference image DB 190, reading a test frame, corresponding to the serial number detected by the recognition mark detection unit 170 from the codec unit 130, and calculating the MOS value of the test frame by comparing the image qualities of the two frames; and a display unit 160 for displaying the test image, input from the codec unit 130, and the MOS value, input from the MOS measurement unit 180.

In the above-described construction, in the case where the test image received through the interface unit 120 has already been decoded into a color signal, the process of passing through the codec unit 130 may be omitted.

Moreover, only in the case where the hue values of pixels assigned to respective bits of the detected recognition mark fall within a predetermined reference range can the recognition mark detection unit 170 recognize the serial number based on the hue values. Here, the reference range is used to determine whether the detected hue values indicate, for example, a black color or a while color. That is, the recognition mark detection unit 170 determines a corresponding test frame that is lost if the detected hue values do not fall within the reference range. Accordingly, a corresponding serial number is not output to the MOS measurement unit 180, and thus MOS measurement in conjunction with a frame corresponding to the serial number is not performed. As a result, although a test frame, the recognition mark of which is lost, is not subjected to MOS measurement, other test frames, the serial numbers of which are recognized, can be continuously subjected to MOS measurement.

Accordingly, the MOS measurement unit 180 synchronizes the test image with the previously stored reference image based on recognition mark information, that is, the serial number, input from the recognition mark detection unit 170, calculates an MOS value by sequentially performing comparison of the image quality of respective frames in the synchronized state, and outputs the calculated MOS value to the display unit 160. Here, the MOS measurement unit 180 may calculate an MOS value for each frame, and may calculate an average MOS value.

Figure 7:
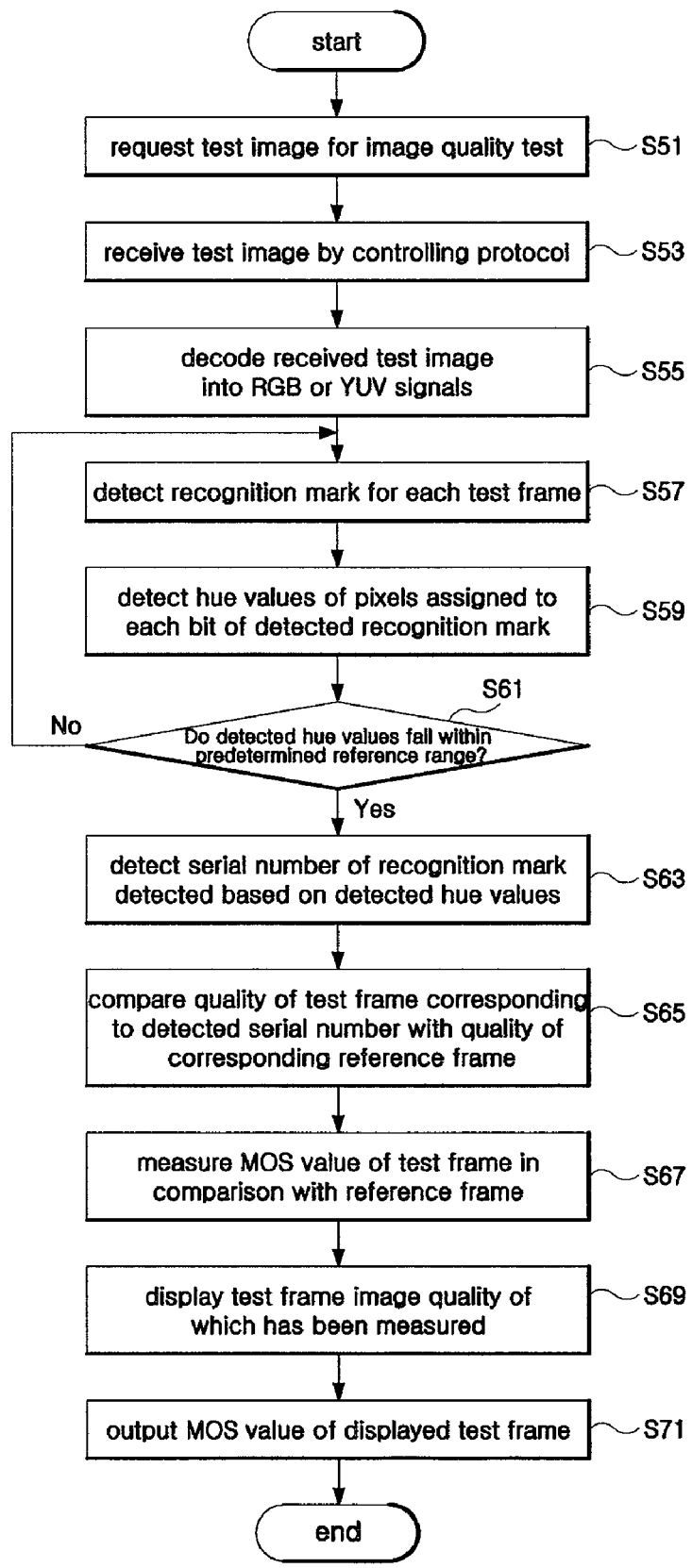
FIG. 7 is a flowchart illustrating a method of measuring the quality of an image according to another embodiment of the present invention.

FIG. 7 is a flowchart illustrating a method of measuring the quality of an image according to another embodiment of the present invention. It is noted that, in this flowchart, the following description is given based on the case where the image quality measurement apparatus 100 performs operation, and receives images from the transmitting terminal 400 in a state of being connected to the receiving terminal 500.

First, step S51 is the step of requesting a test image for the measurement of image quality from the mobile communication terminal 500. In greater detail, at this step, the image quality measurement apparatus 100 controls the receiving terminal 500 so that it generates a call to the transmitting terminal 400. Accordingly, the two terminals 400 and 500 are connected to each other, and the transmitting terminal 400 sends a test image, similar to that shown in FIG. 2, to the receiving terminal 500. Here, the test image may be previously prepared in the transmitting terminal 400, may be stored in the memory of the transmitting terminal 400, or may be stored in a specific notebook computer and then sent to the receiving terminal 500 via the transmitting terminal 400.

Thereafter, the image quality measurement apparatus 100 receives the test image from the transmitting terminal 400 by controlling an image protocol at step S53, decodes the received test image into RGB signals or YUV signals at step S55, detects a recognition mark for each decoded test frame at step S57, and detects the hue values of pixels assigned to each bit of the detected recognition mark at step S59.

Thereafter, at step S61, whether the detected hue values fall within the predetermined reference range is determined. If, as a result of the determination, the hue values are found not to fall within the predetermined reference range, the process returns to step S57, and steps subsequent thereto are repeated. In contrast, if the hue values fall within the predetermined reference range, the process proceeds to step S63 and the serial number of the detected recognition mark is detected based on the detected hue values.

Thereafter, the quality of a test frame corresponding to the detected serial number is compared with the quality of the reference frame at step S65, the MOS value of the test frame compared with the reference frame is measured at step S67, the test frame, the quality of which has been measured, is displayed through the display unit 160 at step S69, and the MOS value of the displayed test frame is output at step S71.

According to the apparatus and method for measuring the quality of an image received via a communication network according to the present invention, a test image, received via the communication network, is synchronized with a corresponding reference image, and the quality of the test image is evaluated relative to the reference image in the synchronized state, so that there is an advantage in that the status of the transmission/reception of image data via the communication network can be inspected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring quality of an image received via a communication network, comprising:
    an interface unit for receiving an image, including a start synchronization image, configured to provide notification of a start of a quality test, and a test image, actually subjected to a quality test, via a communication network;
    a codec unit for decoding the received image, input through the interface unit, into a color signal;
    a test image detection unit for detecting any one value of brightness, saturation and hue information of the color signal input from the codec unit, calculating an average value for each frame, and detecting the test image from the received image based on the calculated average value; and
    a Mean Opinion Score (MOS) measurement unit for synchronizing the test image, detected by the test image detection unit, with a corresponding reference image, comparing quality of the test image with quality of the reference image in a synchronized state, calculating an MOS value based on results of the comparison, and outputting the MOS value.

2. The apparatus as set forth in claim 1, wherein the interface unit has a function of generating a call for connection to a communication terminal.

3. The apparatus as set forth in claim 1, wherein the interface unit has a function of controlling an image protocol for reception of images.

4. The apparatus as set forth in claim 1, wherein the color signal is RGB or YUV signals.

5. The apparatus as set forth in claim 2, wherein the color signal is RGB or YUV signals.

6. The apparatus as set forth in claim 3, wherein the color signal is RGB or YUV signals.

7. A method of measuring quality of an image received via a communication network, the method being configured to compare the received image, including a start synchronization image, adapted to provide notification of a start of a quality test, and a test image, actually subjected to the quality test, with a reference image and to calculate an MOS value based on results of the comparison, the method comprising:
    step (a) of decoding the received image into a color signal;
    step (b) of detecting any one value of brightness, saturation and hue information of the color signal decoded at step (a), and calculating an average value for each frame;
    step (c) of detecting a test image from the received image based on the average value calculated at step (b);
    step (d) of synchronizing the test image, detected at step (c), with a corresponding reference image;
    step (e) of calculating an MOS value of the test image by comparing quality of the test image with quality of the reference image in a synchronized state; and
    step (f) of outputting the MOS value calculated at step (e).

8. The apparatus as set forth in claim 7, wherein the color signal is RGB or YUV signals.

9. An apparatus for measuring quality of an image received via a communication network, comprising:
    an interface unit for receiving a test image, including a plurality of test frames identified using recognition marks, via the communication network;
    a recognition mark detection unit for identifying each test frame, input through the interface unit, by detecting a recognition mark;
    a reference image storage unit for storing a corresponding reference image for a quality test for the test image; and
    an MOS measurement unit for comparing quality of the test frame, corresponding to the recognition mark identified by the recognition mark detection unit, with quality of a reference frame of the reference image, corresponding to the identified recognition mark, calculating an MOS value based on results of the comparison, and outputting the MOS value.

10. The apparatus as set forth in claim 9, further comprising a codec unit for decoding the test image, input through the interface unit, into a color signal, and outputting the decoded test image to the recognition mark detection unit and to the MOS measurement unit.

11. The apparatus as set forth in claim 9, wherein the interface unit has a function of generating a call for connection to a communication terminal.

12. The apparatus as set forth in claim 9, wherein the interface unit has a function of controlling an image protocol for reception of images.

13. The apparatus as set forth in claim 9, wherein the recognition mark detection unit detects hue values of pixels assigned to the detected recognition mark, and recognizes a serial number unique to each recognition mark based on the detected hue value.

14. The apparatus as set forth in claim 10, wherein the recognition mark detection unit detects hue values of pixels assigned to the detected recognition mark, and recognizes a serial number unique to each recognition mark based on the detected hue value.

15. The apparatus as set forth claims 11, wherein the recognition mark detection unit detects hue values of pixels assigned to the detected recognition mark, and recognizes a serial number unique to each recognition mark based on the detected hue value.

16. The apparatus as set forth claims 12, wherein the recognition mark detection unit detects hue values of pixels assigned to the detected recognition mark, and recognizes a serial number unique to each recognition mark based on the detected hue value.

17. A method of measuring quality of an image received via a communication network, the method being configured to compare the received image, including a start synchronization image, adapted to provide notification of a start of a quality test, and a test image, actually subjected to the quality test, with a reference image and to calculate an MOS value based on results of the comparison, the method comprising:
  step (a) of detecting and identifying a recognition mark for each test frame;
  step (b) of comparing quality of a test frame, corresponding to the recognition mark identified at step (a), with quality of a reference frame of a reference image, corresponding to the recognition mark identified at step (a); and
  step (c) of calculating an MOS value based on results of the comparison and outputting the MOS value.

18. The method as set forth in claim 17, wherein step (a) comprises:
  step (a-1) of detecting hue values of pixels, assigned to the detected recognition mark, using the recognition mark detection unit; and
  step (a-2) of recognizing the serial number unique to the recognition mark based on the hue values detected at step (a-1).

* * * * *